United States Patent

Doll

[11] Patent Number: 5,887,621
[45] Date of Patent: Mar. 30, 1999

[54] ON/OFF BIDIRECTIONAL VALVE

[75] Inventor: Robert A. Doll, Glendale, Wis.

[73] Assignee: Applied Power Inc., Butler, Wis.

[21] Appl. No.: 630,285

[22] Filed: Apr. 10, 1996

[51] Int. Cl.[6] .................................. F16K 31/04
[52] U.S. Cl. ............................... 137/625.38; 251/129.07
[58] Field of Search ................ 137/625.38; 251/129.07, 251/129.15

[56] References Cited

U.S. PATENT DOCUMENTS

| | | | |
|---|---|---|---|
| 1,859,876 | 5/1932 | Koplin | 137/625.38 X |
| 1,938,943 | 12/1933 | Terry | 137/625.38 X |
| 2,355,458 | 8/1944 | Mastenbrook | 137/625.38 X |
| 2,369,242 | 2/1945 | Lawler | 137/625.38 X |
| 3,588,039 | 6/1971 | Chelminski | 251/129.15 |
| 3,995,652 | 12/1976 | Belart et al. | 137/102 |
| 4,478,250 | 10/1984 | Lukasczyk et al. | 137/625 |
| 4,577,661 | 3/1986 | Melrose et al. | 137/625.33 |
| 4,643,225 | 2/1987 | Imhof | 137/596 |
| 4,844,122 | 7/1989 | Ichihashi | 137/625 |
| 4,958,704 | 9/1990 | Leiber et al. | 188/285 |
| 5,011,113 | 4/1991 | Stobbs et al. | 251/129 |
| 5,067,687 | 11/1991 | Patel et al. | 251/129 |
| 5,069,420 | 12/1991 | Stobbs et al. | 251/30.02 |
| 5,178,359 | 1/1993 | Stobbs et al. | 251/30.02 |
| 5,186,093 | 2/1993 | Kervagoret | 91/433 |
| 5,234,030 | 8/1993 | Kervagoret et al. | 137/596.17 |
| 5,319,933 | 6/1994 | Omberg et al. | 60/426 |
| 5,328,147 | 7/1994 | Stobbs | 251/30.02 |
| 5,377,720 | 1/1995 | Stobbs et al. | 137/625.65 |

FOREIGN PATENT DOCUMENTS

| | | |
|---|---|---|
| 1 231 514 | 12/1966 | Germany . |
| 530 564 | 12/1972 | Switzerland . |
| 970551 | 9/1964 | United Kingdom . |

OTHER PUBLICATIONS

Abstract of Japanese Pub. No. 60–157575 (1), published Aug. 1985.

Primary Examiner—John Fox
Attorney, Agent, or Firm—Quarles & Brady

[57] ABSTRACT

A bidirectional on/off spool valve has circumferentially-extending through-slots in a spool which are axially alignable with circumferentially-extending grooves in the main bore. The slots and grooves create a flow path through the valve which minimizes Bernoulli forces that tend to close the valve or create negative Bernoulli forces which help keep the valve open. The spool has a stop wall at its closed end which restricts the open area of the lumen of the spool and a balance tube extends forwardly from the stop wall to equalize the pressure behind the stop wall with the pressure in front of the stop wall, so that the spool is not locked in the open position.

3 Claims, 3 Drawing Sheets

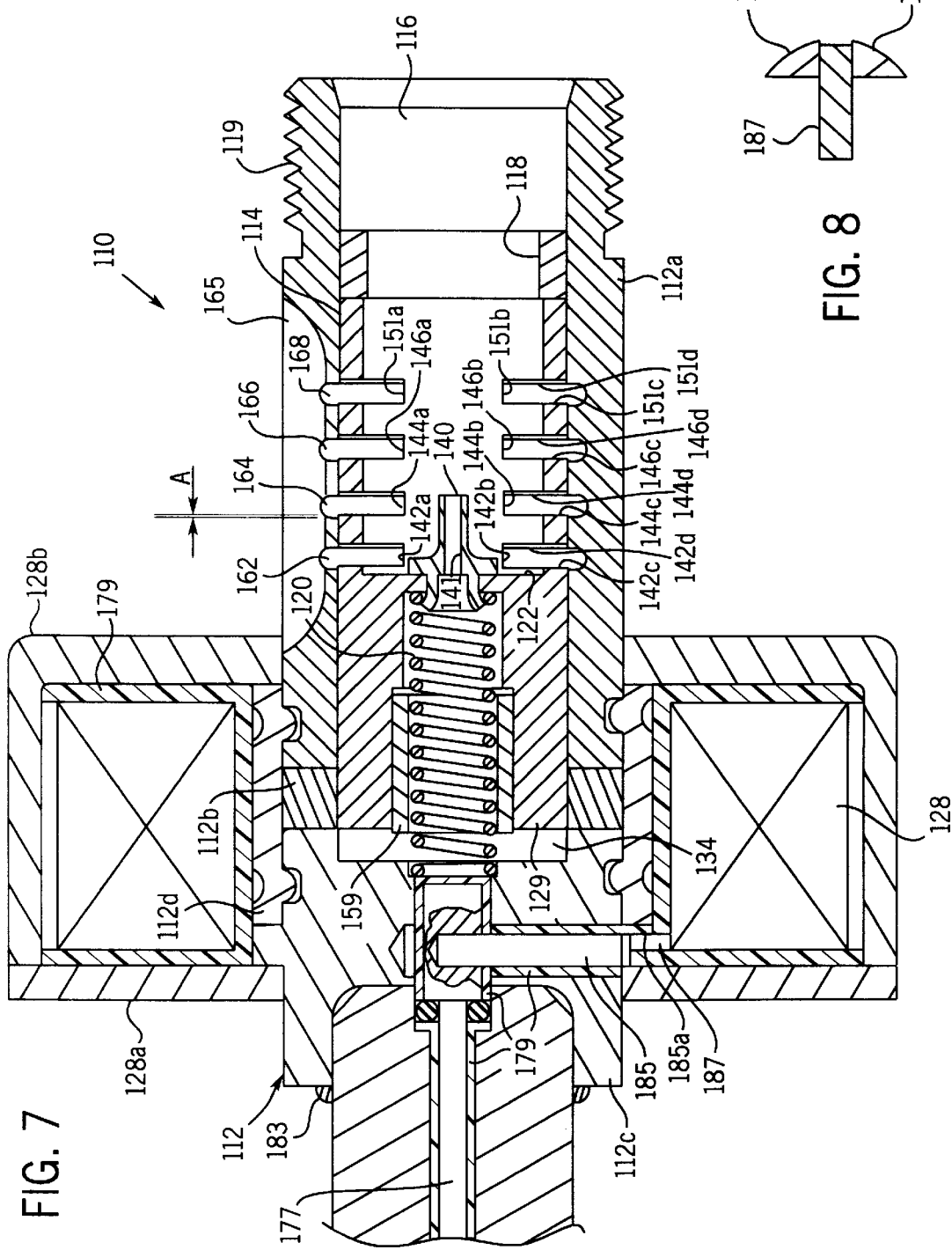

ON/OFF BIDIRECTIONAL VALVE

BACKGROUND OF THE INVENTION

1. Field of the Invention

This invention relates to fluid control valves, and in particular to a spool-type on/off bidirectional valve.

2. Discussion of the Need in the Art

Certain types of flow control valves require the ability to switch very quickly between a low or no-flow, high-pressure drop condition to a high-flow, low-pressure drop condition. This is what is needed, for example, in the in-piston valve of a monotube damper for a vehicle suspension system. In such valves, the inertia and Bernoulli forces of the flowing fluid on the spool can be so high as to close the valve, resulting in erratic operation.

SUMMARY OF THE INVENTION

The invention helps solve these problems in a flow control spool valve of the type having a body defining therein a main bore, a spool axially slidable in the bore between an open position and a closed position, and ports formed in the spool and the body opening into the main bore, the ports being alignable with each other in the open position of the valve. In such a valve of the invention, the port in the spool is in the form of a circumferentially extending through-slot and the port in the body opening into the main bore includes a circumferentially extending groove which is in communication with the slot in the open position of the valve.

The slots and grooves may be of equal width in the axial direction and be aligned with one another in the open position of the valve. Such a construction provides for rapid switching between a low or no-flow, high pressure closed state and a high flow, low pressure open state, with the Bernoulli forces on the spool balanced so as not to interfere with opening the valve.

Alternatively, the leading side (leading when moving toward the open position) may axially traverse the corresponding groove in the body and move axially beyond the distal side of the groove when the spool moves from the closed position to the open position so that in the open position the leading side comes to rest at a position between the corresponding groove and a stop which the spool abuts in the open position. In this position, negative Bernoulli forces are created which act on the spool to help hold it open.

In an especially useful aspect, the spool of a valve of the invention defines a lumen into which the port in the spool opens. At one end of the lumen the lumen opens into the main bore and at the other end of the lumen a stop wall restricts the lumen. A balance tube extends axially in the lumen from the stop wall toward the open end of the lumen. The balance tube provides fluid communication past the stop wall so as to axially equalize the pressures acting on the spool, to further assist in holding it open under high flow conditions and closing the valve.

Other aspects and advantages of the invention will be apparent from the drawings and detailed description.

BRIEF DESCRIPTION OF THE DRAWINGS

FIG. 7 is a cross-sectional view of an alternate embodiment of the invention; and FIG. 8 is a detail enlarged horizontal cross-sectional view of a blade 187 and prongs 185*a* and 185*b* as illustrated in FIG. 7.

DETAILED DESCRIPTION OF THE PREFERRED EMBODIMENTS

Figure 1:
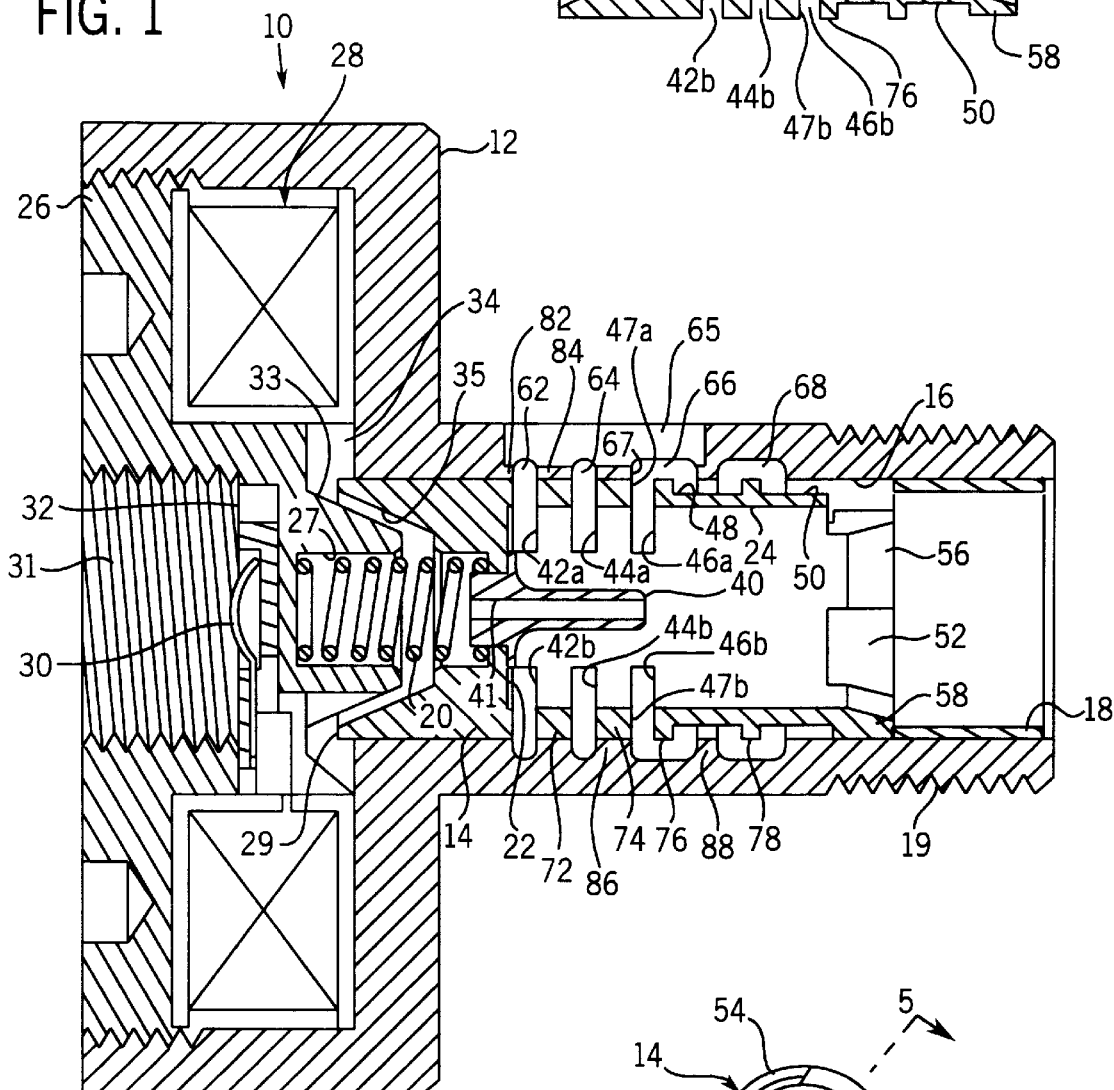
FIG. 1 is a cross-sectional view of a valve incorporating the invention.

FIG. 1 illustrates a valve 10 of the invention which includes a body 12 and a spool 14 axially slidable in a main bore 16 of the body 12. A stop ring 18, which the spool 14 abuts in the open position of the valve 10, is pressed into the open end of the main bore 16 so as to be securely fixed therein. The spool 14 is biased against the stop ring 18 by a spring 20 which acts between the facing side of a stop wall 22, which restricts the open area of the lumen 24 of the spool 14, and a coil cover 26, which is threaded into a cup portion of the body 12 that houses a coil assembly 28. The valve 10 may have external threads 19 as shown at its open end, for example, for mounting the piston (not shown) of a monotube shock absorber, and internal threads 31 at its closed end for receiving the damper rod (not shown) of the shock absorber.

A contact button 30 is provided for making contact between the coil assembly 28 and an electrical conductor rod (not shown) which is coaxial with the damper rod (not shown) which is threaded into the coil cover 26 at 31, the end of the conductor rod abutting the button 30. However, any other suitable means may be used for providing electrical energy to the coil assembly 28. A C-shaped contact ring 32 is also provided around the button 30 for the damper rod (not shown) to bottom against when it is screwed into the cover 26.

The spring 20 acts inside a pressure equalization chamber 34 which is defined between the coil cover 26 and the proximal end 29 of the spool 14. As used herein, "proximal" means in the direction toward the closed position of the spool 14 (leftward as viewed in FIG. 1) and "distal" means in the direction toward the open position of the spool 14 (rightward as viewed in FIG. 1). The spring 20 is guided by being received in a bore 27 in the cover 26, and the cover 26 and proximal end 29 of the spool 14 have complimentary frusto-conical surfaces 33 and 35 to optimize the magnetic forces therebetween, although any shape of complimentary surfaces could be used to practice the invention. The pressure equalization chamber 34 is closed and sealed against fluid leakage at its leftward end (as viewed in FIG. 1) by the electrical conductor rod (not shown, discussed above) being screwed into the coil cover 26. The body 12, spool 14 and cover 26 are preferably made of a magnetically attractable material, such as steel, and the stop ring 18 is preferably made of a non-magnetic material, such as non-magnetic stainless steel.

The pressure in the pressure equalization chamber 34 producing a force on the spool 14 tending to open it are preferably of a magnitude so as to substantially balance the forces on the spool 14, in the open position of the valve 10, so that the solenoid pull-in force required is not excessive. When valve 10 is used in a high-flow rate application, the pressure of the fluid generated by the inertia of the flowing fluid as it changes direction in the lumen 24 of the spool 14 can otherwise cause such a high pressure in the equalization chamber 24 such that the spool 14 is locked open, in the position shown in FIG. 1. When that occurs, the current supply to the coil assembly 28 is unable to overcome the combined forces of the pressure in the chamber 34 and the force of the spring 20 so as to close the valve 10.

To overcome this problem, a balance tube 40 is provided which extends forwardly in the lumen 24 from the stop wall 22 toward the distal end of the spool 14. The balance tube 40 defines a passageway 41 which provides communication in the lumen 24 from one side of the stop wall 22 to the other. It has been found that this balance tube 40 tends to reduce the pressure in the equalization chamber 34 and equalize it with the effective pressure at the open end of the spool 14, such that a pressure imbalance inhibiting closure of the valve 10 is less likely to occur.

Figure 5:
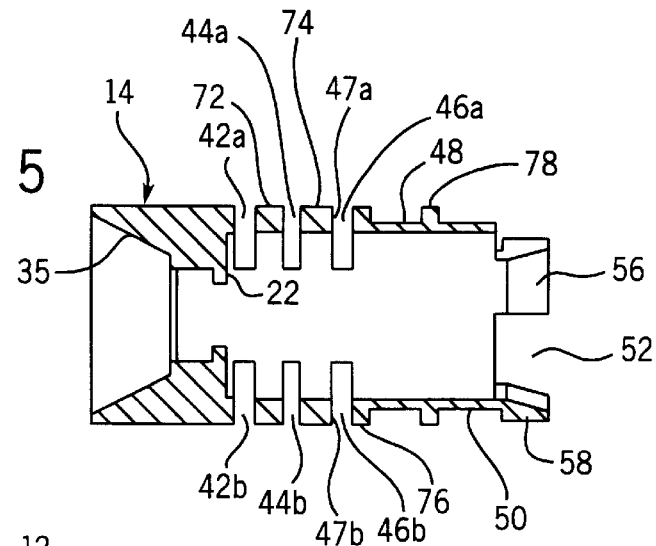
FIG. 5 is a cross-sectional view from the plane of the line 5—5 of FIG. 6 of a spool for the valve of FIG. 1.
Figure 6:
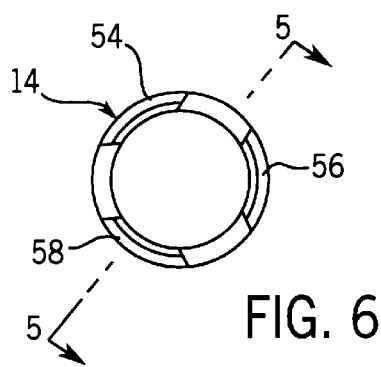
FIG. 6 is an end-plan view of the spool shown in FIG. 5.

Referring particularly to FIGS. 1, 5, and 6, the spool 14 in the area of its lumen 24 has formed in it three sets of circumferentially extending through-slots 42a, b, 44a, b, and 46a, b. The slots a,b of each set 42, 44, 46 do not extend all the way around the spool 14, enough material of the spool wall circumferentially separating the slots a,b of each set so as to maintain structural rigidity of the spool 14. Also, the material of the spool walls between the sets forms lands 82, 84, 86 and 88 which are used to block flow in the closed position of the valve 10, when the coil assembly 28 is energized, as further described below.

Two circumferential grooves 48 and 50 are also formed on the exterior surface of the spool 14, each of which extends all the way around the spool 14. The open end 52 of the spool 14 is defined by three ears 54, 56, and 58, which define the distal side of the groove 50.

Figure 2:
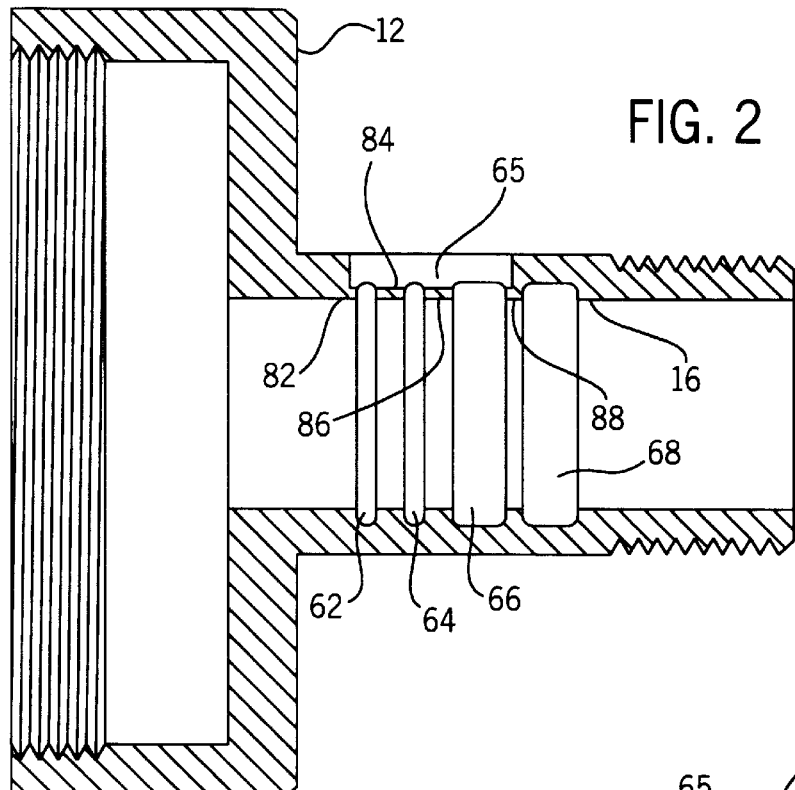
FIG. 2 is a cross-sectional view of a body for the valve of FIG. 1.
Figure 4:
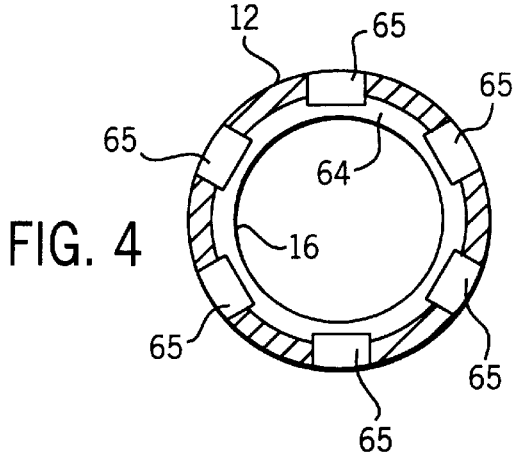
FIG. 4 is a sectional view as viewed from the plane of the line 4—4 of FIG. 3.
Figure 3:
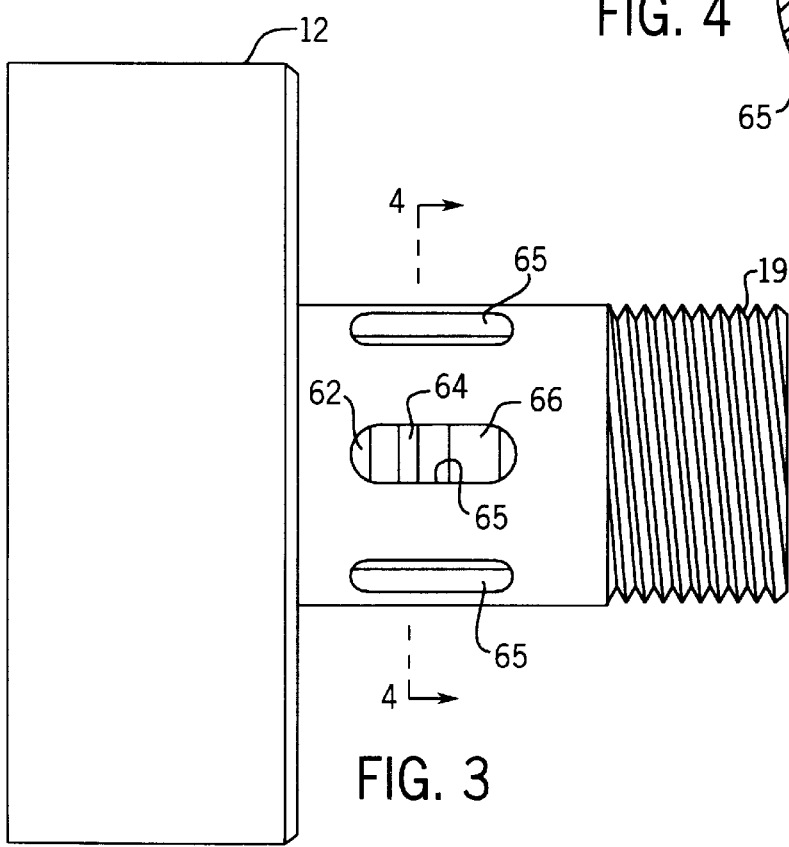
FIG. 3 is a side-plan view of the body of FIG. 2.

The spaces between the ears 54, 56, and 58 permit flow around the end of the spool 14 into a serpentine path between the spool 14 and the main bore 16. Grooves 62, 64, 66, and 68 are formed in the main bore 16 and extend for 360° around the main bore 16. The grooves 62 and 64 are alignable with the slots 42a, b and 44a, b and are equal in width with the slots. The proximal edge 67 of groove 66 is also alignable with the proximal edges 47a, b of the slots 46a and 46b in the open position (FIG. 1) of the valve 10 and grooves 66 and 68, in conjunction with grooves 48 and 50, provide a serpentine path for fluid to flow between the outside of the spool 14 and the main bore 16, after it flows past the openings in the end of the spool 14 between the ears 54, 56, and 58. Axially elongated grooves 65 (FIGS. 1–3) in the exterior of the body 12 are deep enough to break into the grooves 62, 64, and 66 so as to provide passages through the side wall of the body 12 where the axially elongated grooves 65 intersect the circumferential grooves 62, 64, and 66.

The above described flow path through the body 12 provides balanced Bernoulli forces on the spool 14 so that when the valve is open and no current is supplied to the coil assembly 28, the spool 14 remains in the open position. This is especially important for high flow rates and high pressures because imbalances in the Bernoulli forces under such conditions tend to close the valve 10, exacerbating the problem of providing a high flow, high pressure hydraulic on/off valve.

The valve 10 is closed by the spool 14 being moved leftwardly (as viewed in FIG. 1) by energizing the coil 28. When that occurs, the lands 72, 74, 76, 78 on the spool 14 are moved axially to close off flow between them and the respective lands 82, 84, 86, 88 of the main bore 16.

Referring to FIG. 7, a valve 110 is illustrated which incorporates the invention. The valve 110 is substantially the same as the valve 10, except for the differences described below. In the valve 110, elements corresponding to the elements of the valve 10 have been identified with the same reference number as the valve 10, plus 100.

A fourth set of slots 151a, b is formed in the spool 112, and all of the grooves 162, 164, 166 and 168 are made like the grooves 62 and 64 in the first embodiment 10, being of the same width as the respective slots 142a, b; 144a, b; 146a, b; and 151a, b. Thus, the serpentine pathways between the spool 14 and body 12 are not provided in the valve 110, and correspondingly it is not necessary to provide the ears 54, 56 and 58, and grooves 48 and 50, in the valve 110. Instead, the distal end of the spool 114 which abuts the stop ring 118 can be made flat as shown, with the spool 114 of a single outside diameter for its length.

The opposite, proximal end 129 of the spool 114 is also flat, as is the facing end of the body 112. This construction provides a radial flat face magnetic flux field between the body 12 and the proximal end 129, which results in an increased initial pull-in force and therefore reduced power consumption. A non-magnetic stainless steel spool stop sleeve 159 surrounds the spring 120 and is secured to the spool 114 by a press fit or other suitable connection. The sleeve 159 extends slightly beyond the proximal end 129 of the spool 114 to prevent contact between the end 129 and the facing flat face of the body 112, which could create a high magnetic force between the body 112 and spool 114. The sleeve 159 also contributes to being able to use a very light spring 120, and preloading it with a very low force.

The balance tube 140 in the valve 110 is somewhat shorter than the tube 40 in valve 10, the exact length being determined by the particular application and valve design. Also, the end of the tube 40 which extends to the coil side of the stop wall 118 is flared to connect the tube 40 to the spool 114. This form of connection could also be used with the tube 40, particularly if the wall thickness at the coil end of the tube 40 was reduced somewhat.

Also contributing to being able to use a light spring force, and thereby reduce the pull-in current needed, is the fact that in the valve 110, in the open position in which the spool 114 is abutting the stop ring 118, the slots 142a, b; 144a, b; 146a, b; and 151a, b are slightly beyond being aligned with the respective grooves 162, 164, 166 and 168 by a distance "A" illustrated in FIG. 7. In this position, the trailing sides 142c, 144c, 146c and 151c of the respective slots 142a, b; 144a, b; 146a, b; and 151a, b, i.e., their sides which are in the direction toward the closed position (their left sides in FIG. 1), are between the proximal and distal sides of the respective groove 162, 164, 166 and 168. The leading sides 142d, 144d, 146d and 151d, i.e., their sides which are in the direction toward the open position (their right sides in FIG. 1), are axially beyond the distal side of the respective groove 162, 164, 166 and 168, being between the respective groove 162, 164, 166 and 168 and the stop ring 118. For clarity, the leading and trailing sides 142d, 144d, 146d, 151d and 142c, 144c, 146c and 151c are only labeled in FIG. 7 for the slots 142b, 144b, 146b and 151b, it being understood that the slots 142a, 144a, 146a and 151a also have leading and trailing sides on the same sides as the slots 142b, 144b, 146b and 151b. Also, in the open position of the spool 114 relative to the body 112, negative Bernoulli forces are created which act on the spool 114 to help hold it open, against the inertia forces of the fluid flowing through the valve 110 which tend to close the valve 110. These beneficial negative Bernoulli forces increase with greater flow rates and with increases in the distance "A".

The body 112 of the valve 110 is made in a cost effective manner in four pieces: a tubular steel foundation 112a which defines most of the main bore 116; a non-magnetic stainless steel spacer 112b which is in the form of a ring; a steel pole piece 112c which defines the closed end of the main bore 116 and houses electrical connections for the coil 128; and a non-magnetic stainless steel connector sleeve 112d, which is roll-formed to hold the foundation 112a, spacer 112b and pole piece 112c together.

Many variations on this construction are, of course, possible. For example, the roll forming could be done at the ends of the sleeve 112d, into suitable grooves in the foundation 112a and pole piece 112c, or the roll formed connection could be replaced by a threaded connection. The coil assembly 128 is slipped over the body assembly 112 from the left end as viewed in FIG. 7 so as to make the electrical connection illustrated in FIG. 8 and described below, and is encased by covers 128a and 128b, which are sealed and secured to the body 112 by any suitable means.

The pole piece 112c houses electrical connections between a conductor rod 177 and the coil 128 which must be secure, reliable and relatively easy to make. The conductor rod 177, coil 128 and related electrical parts are electrically insulated form the other parts of the valve 110, which are grounded, by insulation 179, typically a suitable plastic sheathing. Before any of the insulation 179 is installed, the damper rod 181 of the shock absorber (not shown) is welded to the pole piece 112c, as shown at 183. The insulation 179 and conductor rod 177 (e.g., brass) are then installed prior to installation of the spool 114 into the main bore 116, and a conductor pin 185 (e.g., brass) is inserted through an insulation sheathed bore in the pole piece 112c and into a bore in the enlarged end of rod 177 to make electrical contact therewith.

The end of pin 185 which extends beyond pole piece 112c is ground flat and slotted so as to define two prongs 185a and 185b, as best shown in FIG. 8. The coil 128 has a blade 187, to which one end of the coil 128 is electrically connected, which is received between the prongs 185a and 185b to make electrical contact therewith. The other end of coil 128 may be grounded to the body 112.

Many modifications and variations to the preferred embodiment described will be apparent to those skilled in the art. Therefore, the invention should not be limited to the embodiment described, but should be defined by the claims which follow.

I claim:

1. In a flow control spool valve of type having a body defining therein a main bore, a spool axially slidable in said bore between an open position and a closed position, and ports formed in said spool and said body opening into said main bore, the improvement wherein:

said port in said spool is in the form of a circumferentially extending through-slot and said port in said body opening into said main bore includes a circumferentially extending groove which is in communication with said slot in said open position of said valve;

wherein each through-slot in said spool has a leading side and a trailing side and each groove has a proximal side which is in the axial direction toward said closed position and a distal side which is in the axial direction toward said open position, said leading side axially traversing said corresponding groove in said body from said proximal side to said distal side of said groove and going axially beyond said distal side when said spool moves from said closed position to said open position.

2. The improvement of claim 1, wherein in said open position said spool abuts a stop which is fixed to said body.

3. The improvement of claim 1, wherein in said open position said trailing edge is positioned axially between said proximal edge and said distal edge.

* * * * *